Figure 7:
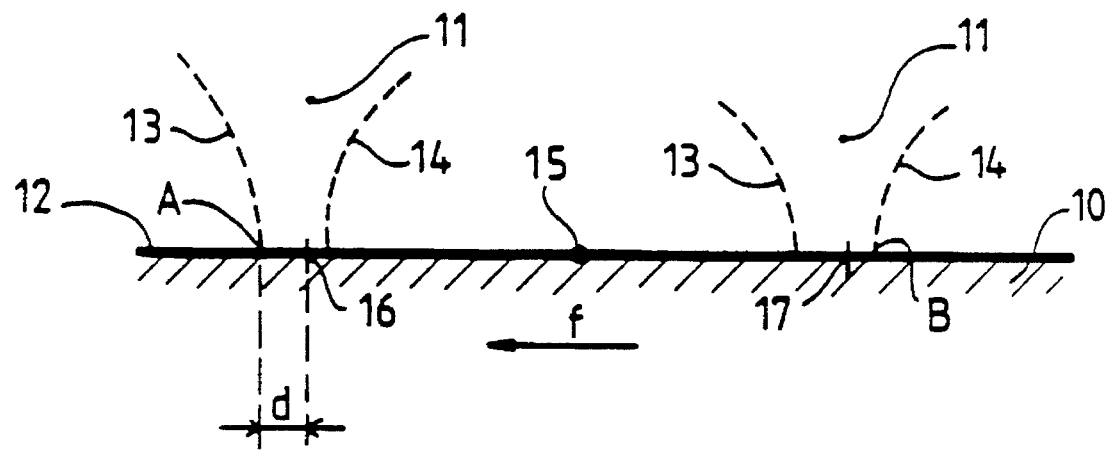

United States Patent [19]

Le Carvennec

[11] Patent Number: 5,475,672
[45] Date of Patent: Dec. 12, 1995

[54] VARIABLE-LENGTH INFORMATION RECORDING WITH REFERENCE MARKS FOR TIME REFERENCE DURING INFORMATION READING

[75] Inventor: François Le Carvennec, Cernay, France

[73] Assignee: Thomson-CSF, Puteaux, France

[21] Appl. No.: 140,034

[22] PCT Filed: Mar. 2, 1993

[86] PCT No.: PCT/FR93/00208

§ 371 Date: Nov. 3, 1993

§ 102(e) Date: Nov. 3, 1993

[87] PCT Pub. No.: WO93/18514

PCT Pub. Date: Sep. 16, 1993

[30] Foreign Application Priority Data

Mar. 3, 1992 [FR] France ................... 92 02498

[51] Int. Cl.⁶ .................................................. G11B 7/007
[52] U.S. Cl. .................. 369/275.3; 369/48; 369/54; 369/58; 369/59; 369/116; 369/124
[58] Field of Search .................. 369/275.3, 13, 369/48, 59, 51, 275.1, 275.4, 54, 58, 116, 124

[56] References Cited

U.S. PATENT DOCUMENTS

| 4,873,680 | 10/1989 | Chung et al. | |
| 4,932,017 | 6/1990 | Van Uijen | 369/48 |
| 5,161,145 | 11/1992 | Ogawa et al. | 369/59 |
| 5,339,303 | 8/1994 | Yoshimaru | 369/59 |

FOREIGN PATENT DOCUMENTS

| 0319102 | 6/1989 | European Pat. Off. . |
| 0414517 | 2/1991 | European Pat. Off. . |
| 0430811 | 6/1991 | European Pat. Off. . |
| 2664420 | 1/1992 | France . |

OTHER PUBLICATIONS

I.E.E.E.: "Topical Meeting on Optical Data Storage", Technical Digest Series 1987, vol. 10, (Optical Society of America, Washington, D.C. 1987) pp. 64–67, Saito et al.: High Storage Density Optical Disks using Pit Edge Recording on Pb–Te–Se Thin Films, *voir p. 66, lignes 4–11*.

*Primary Examiner*—Georgia Y. Epps
*Assistant Examiner*—Kim-Kwok Chu
*Attorney, Agent, or Firm*—Oblon, Spivak, McClelland, Maier, & Neustadt

[57] ABSTRACT

The information is recorded in the form of variable-length alterations ($l_0$, $l_0+N\Delta l$), for example in the form of localized ablations of a thermosensitive layer of the medium. This type of coding of the information is sensitive to imprecisions in the form factor which are due to the non-linearity inherent in the recording method used. The method according to the invention consists in recording marks ($M_1$, $M_2$) serving as length reference, from place to place. These marks ($M_1$, $M_2$) are recorded at the same time and in the same conditions as the information proper ($d_1$, $d_2$, $d_3$). During the read process, they serve as length references for the associated information area, and after conversion into electrical signals as time reference.

15 Claims, 6 Drawing Sheets

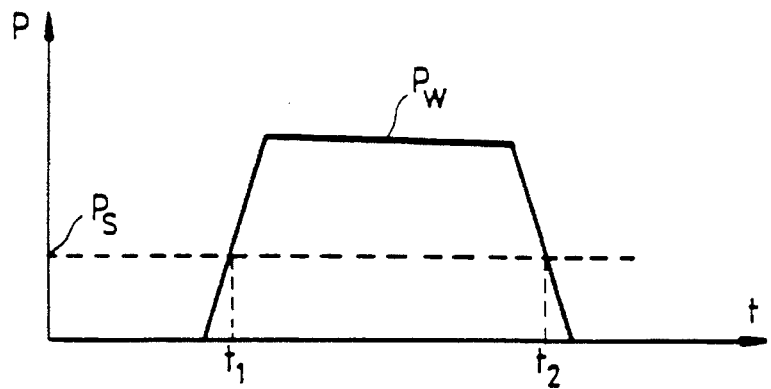
FIG.1
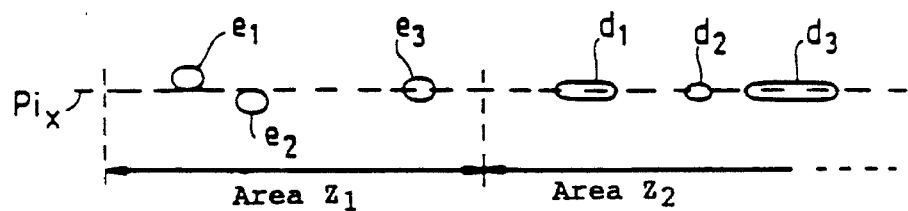
FIG.2
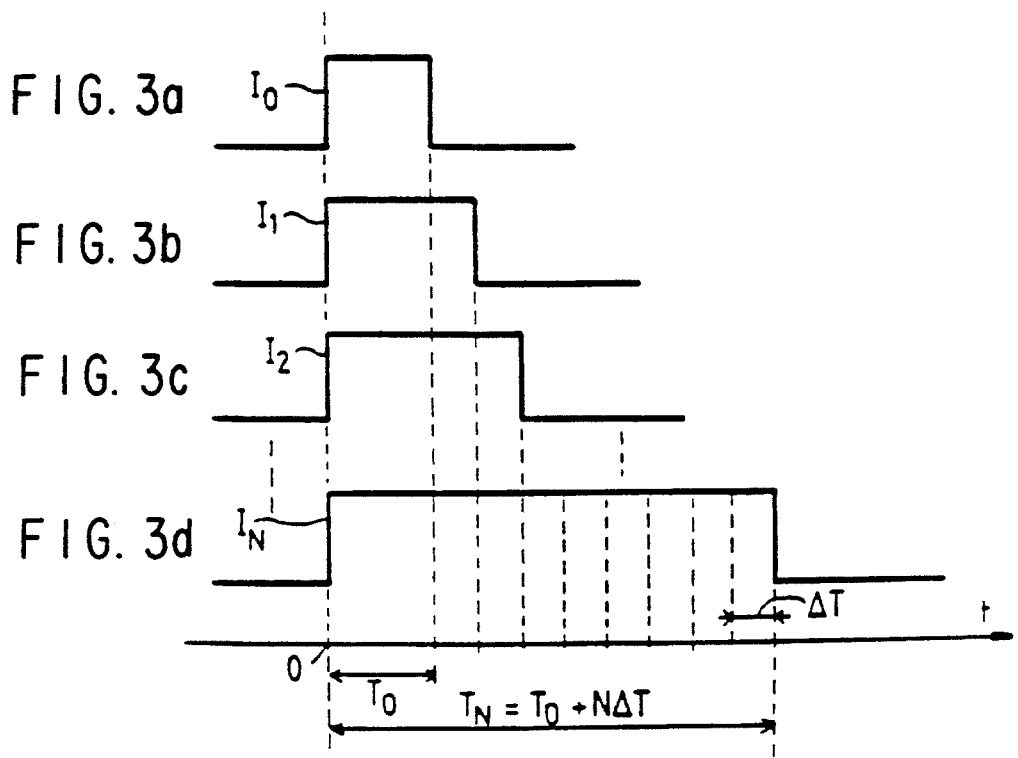
FIG. 3a
FIG. 3b
FIG. 3c
FIG. 3d

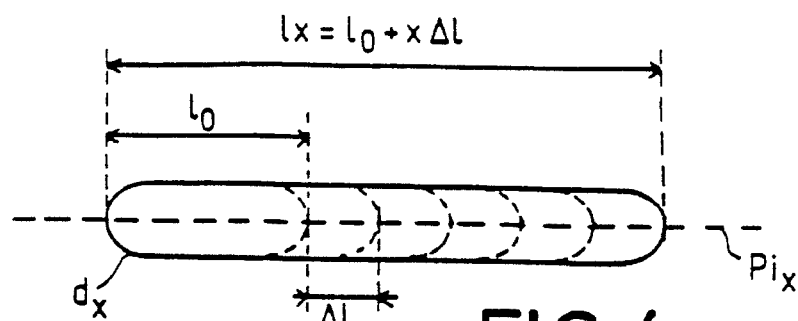
FIG.4
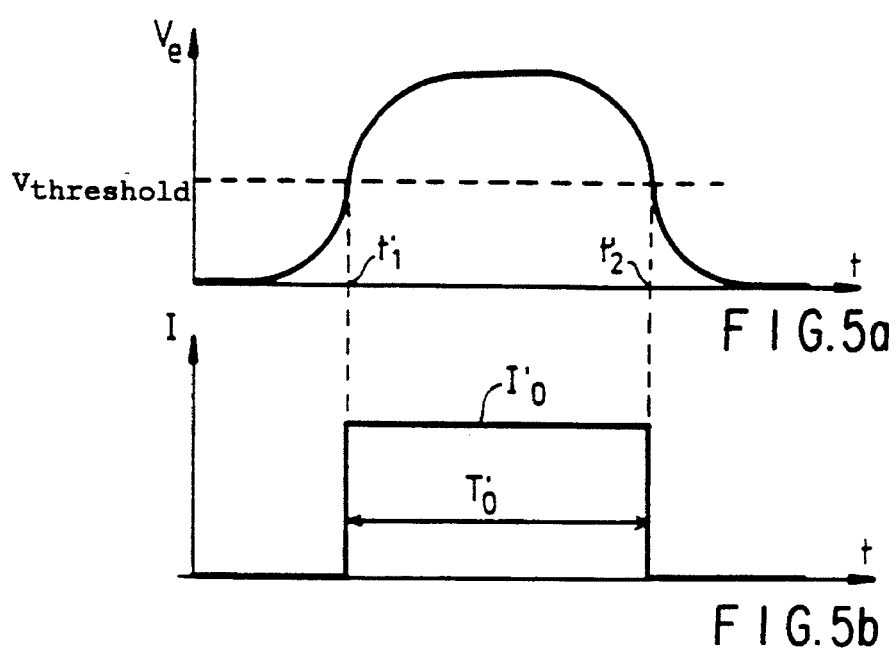
FIG.5a
FIG.5b
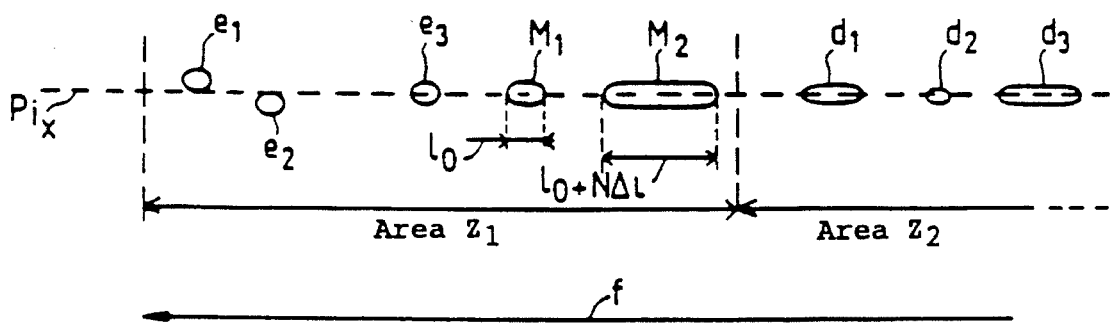
FIG.6

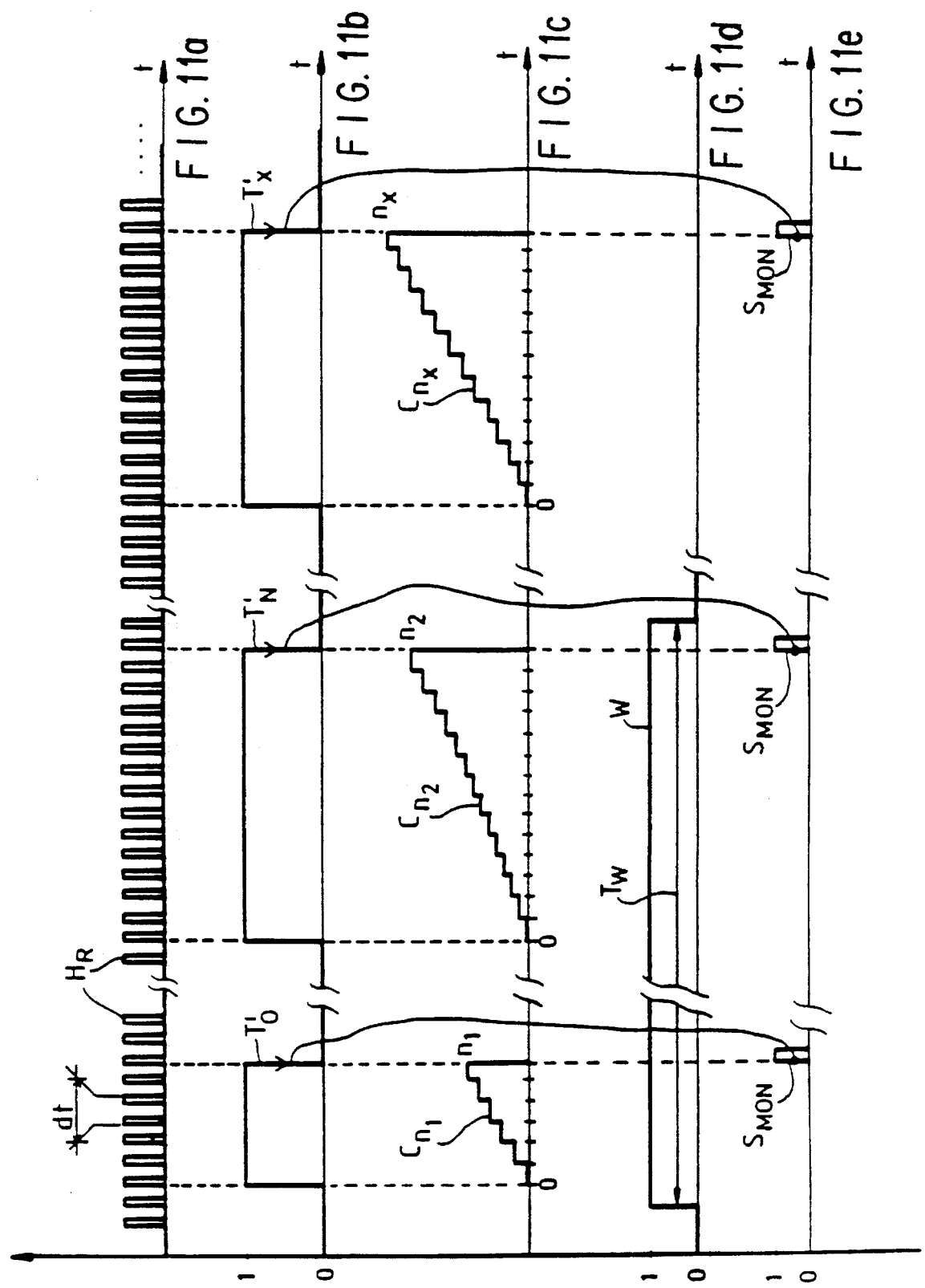

VARIABLE-LENGTH INFORMATION RECORDING WITH REFERENCE MARKS FOR TIME REFERENCE DURING INFORMATION READING

The present invention relates to a movable information medium, in particular in the form of a disk intended for recording/reading of information along tracks.

The media currently used are equipped with a structure having preformats produced during a pre-etching phase.

These preformats are used to generate service signals allowing the recorder/reader to operate: physical representation of the axis of the track, focussing, synchronization, addresses, etc.

Numerous pre-etching methods have been proposed. Among these may be mentioned the method as described in French patent application No. 82 04218 filed on 12 Mar. 1982 and published under U.S. Pat. No. 2,523,347 on 16 Sep. 1983.

The method described consists in providing, along virtual tracks of an information medium, discrete, non-contiguous elements physically representing the mean axis of the said tracks and framing areas intended for the recording of information. These discrete elements, called "flags", must, naturally, be able to be discriminated by some means from the elements representing so-called "useful" information.

This method is, moreover, in accordance with one of the solutions currently adopted at the present time for producing optical or magneto-optical disks.

In reality, two main formats exist, which have been described in ISO standards: ISO 9171, 1 and 2, in the case of media of the read-only, or "Write Once" type according to the terminology; or in the ISO 10089 standard in the case of magneto-optical disks.

They are referred to as the A format and the B format.

The first format (A format) is known as continuous-composite. This format is characterized by continuous, pre-etched grooves, possibly interrupted from place to place. These grooves serve for guiding the beam during writing or reading of information. The pre-etched grooves may be arranged centred between two information tracks, or, in contrast, be coincident with the information tracks.

The second format (B format) based on a method of track following with sampling. The abovementioned French patent application belongs to this format class.

According to the ISO standard, each circular track includes 32 sectors numbered from 0 to 31. Each sector itself includes 43 segments each of 18 bytes.

The first segment is called "Header" according to the terminology, and may be compared with the flags described in the abovementioned French patent application.

In effect, it includes a certain number of pre-etched elements the functions of which are detailed by the standard.

Among the main functions fulfilled by these pre-etched elements may be mentioned, in particular, track following, focussing and synchronization. They must also carry out the abovementioned discrimination function, also called recognition function.

One of the problems encountered during the phase of recording data relates to exerting control over the form factor of the etched elements.

In fact, use is made of a thermal effect, produced by a laser beam, for recording an information element. Physically, this action translates into an alteration in the sensitive thin layer of the medium. This alteration may take different forms: ablation, that is to say disappearance of the layer, deformation, for example in the form of a bubble, or also a crystallographic phase change. The heat may also, with the aid of a magnetic field generator, bring about a modification of the magnetization condition of the said layer.

In reading, a laser beam is also used, of lower power, for reading these alterations. It can thus be envisaged that use is made of non-linear effects. Below a certain heating threshold, there is no alteration in the layer.

For various reasons related, for example, to the quality of the material constituting the layer, to the conditions of setting up the etching laser beam and especially to the power setting as well as to the focussing, the dimensions of the alteration will be more or less well controlled.

To these causes the so-called thermal effect must also be added.

Since it is necessary to exceed a temperature threshold so that there can be an alteration in the sensitive layer, it can be seen that the physical conditions for recording are not the same according to whether or not there is a prior recording in the current recording space. If there is, the rise in temperature will be more rapid and thus the threshold more quickly reached.

In order to alleviate the latter problem, solutions have been proposed in French patent application No. 90 08542 filed on 5 Jul. 1990 and published on 10 Jan. 1992 under U.S. Pat. No. 2,664,420.

These spurious phenomena have an impact on the form factor or duty cycle, that is to say, eventually, on the transitions between the logic "0" and "1" of the recorded information.

Various types of information codings have been used. A first class comprises the codes which are not very sensitive to the form factor: NRZ code, etc.

The drawback of these codes is that they offer less economic performance if the recording density aspect is considered.

In order to increase this recording density, recourse has been had to codes of the pulse length modulation type, or PWM, for "Pulse Width Modulation". More generally, these are codes in which the information is represented by the position of the transition fronts of the signals.

It can easily be envisaged that, due to this characteristic, this type of codes is especially sensitive to the quality of the form factor.

In order to illustrate the invention, in a more precise way, in what follows, information will be represented by an etched element the length of which varies in increments. It is therefore evident that the smaller the increment, the higher the density of information which can be written onto a disk.

Referring to what has been recalled, the precision in the length of an etched element, and thus also of an increment, is limited by a certain number of parasitic effects. It is, furthermore, difficult to obtain good reproducibility of these lengths.

It follows that the maximum density of information which can be written on the medium is all the more limited.

The invention aims to alleviate the drawbacks of the prior art which have just been recalled.

In order to do this, the method according to the invention makes provision for writing etched elements serving as a length reference from place to place along tracks intended for the recording of data.

These etched elements are written at the same time and in the same conditions as the information proper is written.

Although particularly adapted to the recording of data according to the so-called sampled format, the method according to the invention applies equally well to the so-called continuous-composite format.

Thus the subject of the invention is a method of recording/reading information along tracks of a movable medium given a uniform drive speed comprising a phase of recording the said information, this phase comprising a step of forming variable-length alterations in a layer of material of the medium with the aid of means for converting variable-duration pulsed information signals, the transitions between altered regions and unaltered regions of the said layer representing information, characterized in that the writing phase comprises an additional step of forming a series of sequences of alterations in the said layer, of different lengths and at least equal to two in number within each sequence with the aid of conversion means, each sequence of alterations being associated with a particular area in which are formed the alterations representing information and forming length references for this area; and in that it comprises a read phase, this phase comprising a step of reading the length-reference alterations and converting them into duration-reference pulsed signals, for the associated area, a step of reading the alterations representing information formed in the said associated areas and converting them into pulsed signals and a step of reproducing the recorded information by comparison with the duration-reference pulsed signals.

The subject of the invention is also a device for implementing such a method.

Figure 8:
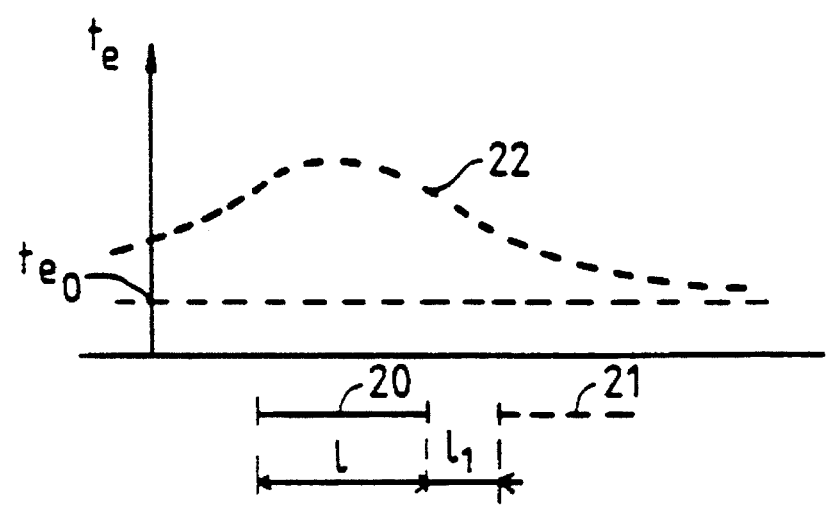
Figure 9:
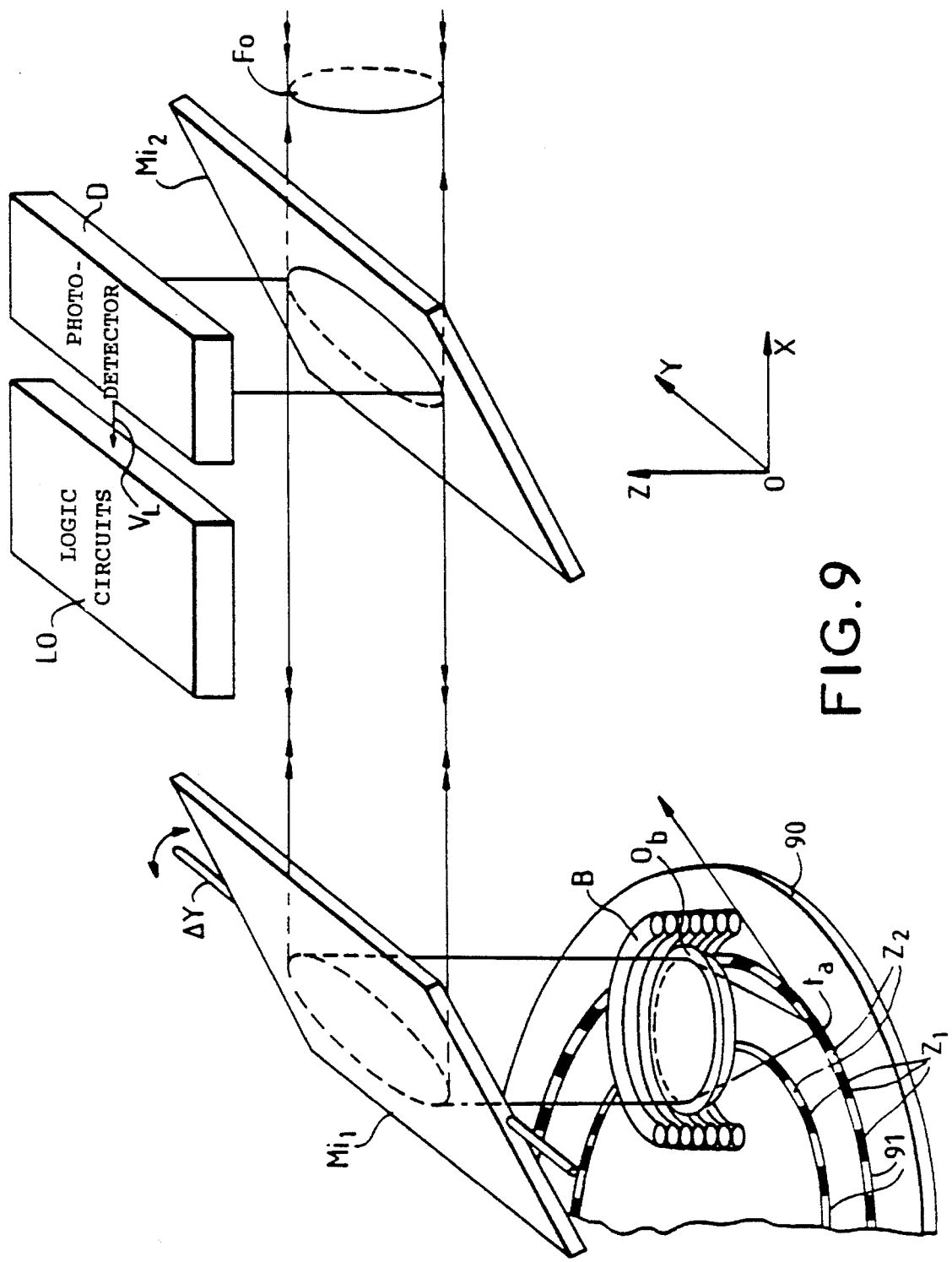
Figure 10:
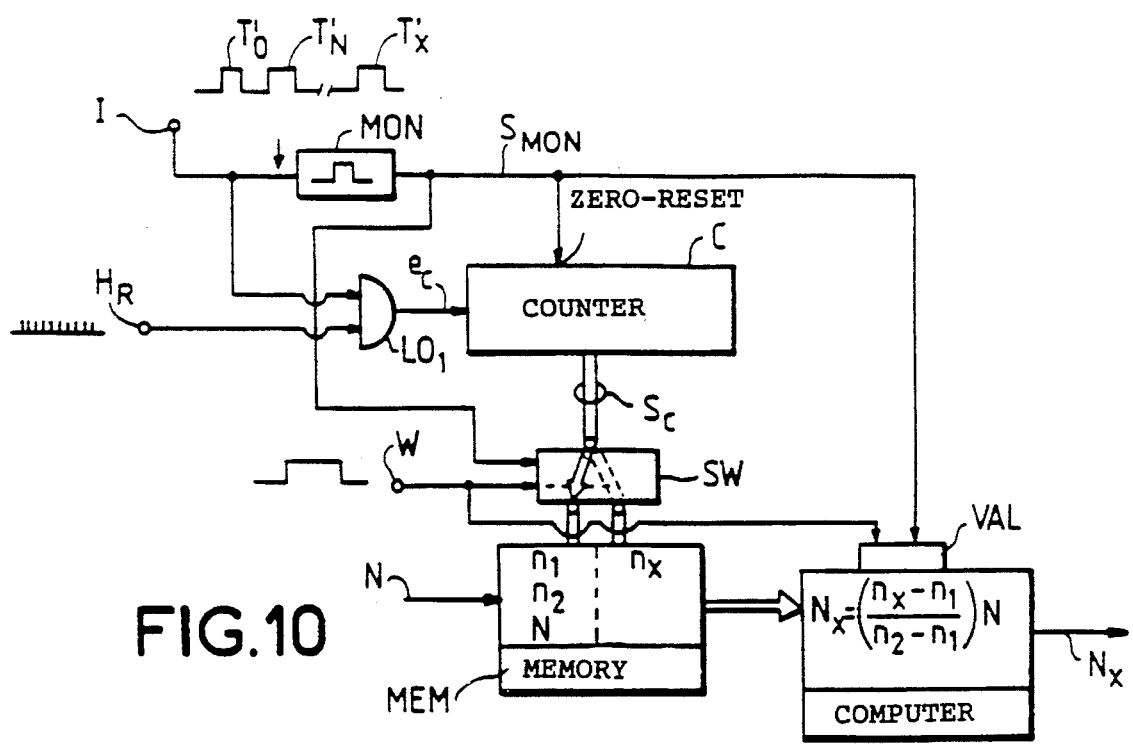
Figure 12:
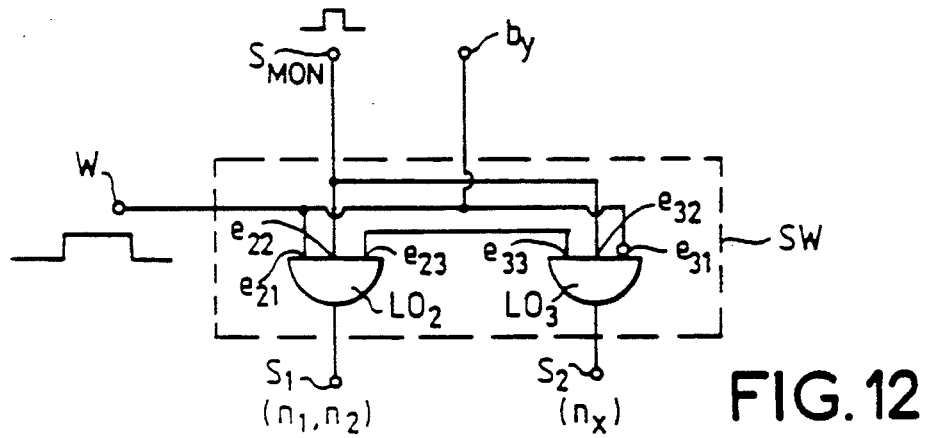
Figure 13:
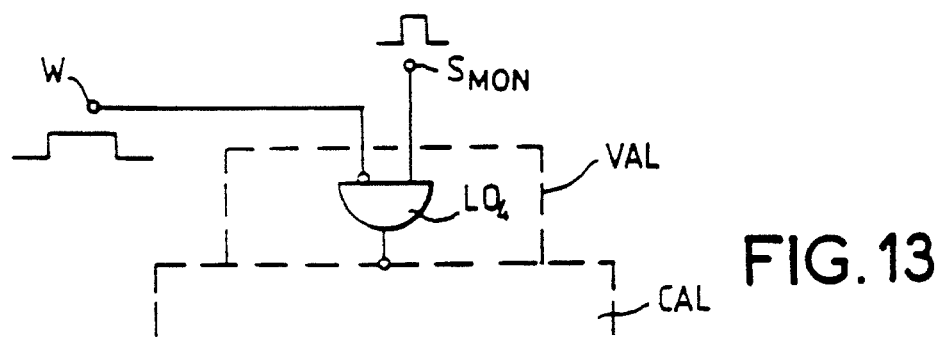

The invention will be better understood and other characteristics and advantages will appear with the aid of the description which follows, with reference to the attached figures among which:

FIG. 1 is a timing diagram illustrating a laser write pulse,

FIG. 2 diagrammatically illustrates a track portion of a movable information medium according to the prior art, FIG. 3 is a timing diagram illustrating modulation signals, FIG. 4 diagrammatically illustrates the detail of an etched element, FIG. 5 is a timing diagram illustrating read signals, FIG. 6 diagrammatically illustrates a track portion of a movable information medium according to a variant embodiment of the invention, FIGS. 7 and 8 diagrammatically illustrate the thermal effect appearing upon the recording of data, FIG. 9 diagrammatically illustrates an optical disk recorder/reader apparatus, FIG. 10 illustrates a device allowing the implementation of the method of the invention, FIG. 11 is a timing diagram relating to the main signals used by the device of FIG. 10, FIGS. 12 and 13 relate to embodiment details of the device of FIG. 10.

First of all, with reference to FIG. 1, the process of recording an information element on a movable optical or magneto-optical medium will be recalled briefly. It will be assumed in what follows, in order to establish the ideas and without that being limiting, that this is a disk. Moreover, it will also be assumed that the structure of this disk is in accordance with the so-called sampled recording scheme.

In FIG. 1 is represented a laser pulse $P_w$ allowing recording of an elementary information item, that is to say a write pulse, of substantially rectangular shape, to within the rise and fall times. On the ordinate is represented the power P transmitted to the medium and on the abscissa the time t.

It is assumed that writing is effective from a certain threshold $P_s$. This is represented, for example, by the ablation of the sensitive layer of the medium. This ablation is effective during the time interval $t_1-t_2$.

If, at first, all parasitic phenomena are set aside, the disk turning at constant speed, an ablation length of the layer corresponds, in a perfectly one-to-one manner, to the time interval $(t_1-t_2)$.

As has been indicated, if a so-called sampled structure is used, successions of two types of areas are found along the circular tracks of the disk: areas which will be called "flags" in what follows, containing pre-etched elements, and post-etching areas, intended for the recording of the so-called useful information.

Such a structure has been represented diagrammatically in FIG. 2.

The $Z_1$ area is the "flag" area. It comprises, in the example described, three pre-etched areas $e_1$ to $e_3$, of generally circular shape. The elements $e_1$ and $e_2$ have been etched on either side of the hypothetical axis of a track $Pi_x$ of arbitrary rank x. By way of indication, a value usually adopted for the distance separating the centre of these elements from the axis of the track is of the order of a quarter of the distance separating two tracks. These elements $e_1$ and $e_2$ are usually utilized to provide track following upon writing or reading.

The element $e_3$ is centred on the track $Pi_x$ and serves as synchronization element for the read or write clocks for the data read or to be recorded in the $Z_2$ area.

The distance separating the elements $e_2$ and $e_3$ is such that it allows unambiguous recognition of the "flag" area with respect to the other areas. It is spoken of as "single distance".

Other methods may be employed to provide this recognition.

The area $Z_2$ is intended for the recording of so-called useful information. In FIG. 3, three information elements $d_1$, $d_2$ and $d_3$ are represented, centred with respect to the track $Pi_x$ but of different lengths.

It will be assumed in what follows that coding of the information based on the modulation of the duration of a pulse is used.

More precisely, it is assumed that the modulation is of the incremental type.

FIG. 3 illustrates the electrical modulation signals used for write control. The shortest pulse $I_0$ has a duration equal to $T_0$. The duration of the other pulses $I_1$ to $I_N$ is given by the general formula: $T_N=T_0+N\Delta T$, a formula in which $\Delta T$ is the time increment.

By way of example, for $I_2$, $T_2=T_0+2\Delta T$.

These modulation signals are converted into laser write pulses of equivalent durations and therefore into etchings of lengths proportional to the duration of application of the laser pulses.

If the minimal length of the etching element which can be written, and which corresponds to $I_0$, is called $l_0$, the length of any etched element $d_x$ is given by the formula: $l_x=l_0+x\Delta l$.

To establish the ideas, a typical value of $l_0$ is 0.8 μm. The increments $\Delta l$ in these condition will be chosen to be equal to 0.3 or to 0.4 μm.

In this formula x represents the number of increments and $\Delta l$ an increment whose length is in one-to-one relation with $\Delta T$ in the absence of parasitic phenomena.

FIG. 4 diagrammatically represents the etched element $d_x$.

When such an etched element is going to be read, by an optical route, there is obtained, after optical-electrical conversion, a bell-shaped electrical signal $V_1$, including a plateau more or less extended along the length of the etched element.

Such a signal $V_1$ is illustrated diagrammatically on the upper part of the timing diagram of FIG. 5. If a threshold $V_{threshold}$ is applied to this signal, it is possible to convert it into a rectangular signal. This type of processing is well known.

In FIG. 5 it has been assumed implicitly that the etched element corresponded to the minimal-duration modulation signal $T_0$ (FIG. 3). The length of the etched element is thus equal to $l_0$ (FIG. 4).

The application of the threshold $V_{threshold}$, as illustrated by the lower part of the timing diagram of FIG. 5, means that the pulse I is a pulse, marked $I'_0$, of duration $T'_0=(t'_2-t'_1)$.

The instants $t'_1$ and $t'_2$ correspond to the intersection of the threshold $V_{threshold}$ and of the curve $V_1$.

In the present case, the curve $V_1$ reduces in practice to a bell-shaped curve. The duration $T'_0$ of the pulse $I'_0$ is different from $T_0$ and in general lower than the latter. However, a one-to-one relationship exists between these two durations, in the absence of any spurious phenomenon.

This is, however, not the case in reality, for the reasons which have been recalled.

For the same duration $T_N=T_0+N\Delta T$ of the modulation signal, different lengths of alteration are obtained, on writing. In other words, there is no reproducibility.

In reading, the phenomenon may be accentuated. A certain number of causes of malfunctioning exist: defocusing, imperfect following of the track, fluctuation in the speed, etc. It results therefrom that, for the same ablation length, the duration of the signal read may fluctuate.

It is the same for the increments. The time increments $\Delta T$ (FIG. 3) are represented by length increments $\Delta l$ (FIG. 4) which in their turn are represented, in reading, by time increments which will be called $\Delta T'$ in what follows. The reproducibility of these time increments is thus equally difficult to obtain.

It can, however, be envisaged that if only limited time intervals or equally limited recording lengths are taken into consideration, there is a chance of obtaining a reproducibility of the various parameters, sufficient for an application in question. The two abovementioned conditions are, moreover, counterparts of one another, since, on a movable medium, driven at constant speed, there is time-space ratio which is also constant.

In fact, in the abovementioned conditions, the variations in the characteristics of the material, the drive speed variations and variations in the other parameters recalled remain limited, except in faulty operation. The latter case falls, naturally, outside the context of the invention.

The invention takes advantage of this observation.

According to one of the main characteristics of the invention, concurrently with the writing of information data, etched elements will be written, which will, in what follows, be called reference marks. These reference marks will be associated with limited-length recording areas.

More precisely, these marks will be etched at least equal to two in number for each information area and will serve as a length reference for all the etched elements recorded in the latter. They will differ by at least one length increment $\Delta l$.

In a preferred variant, illustrated by FIG. 6, the reference marks will be post-etched in the area which will be called "flag" area: area $Z_1$ in a space left free in this area.

In this figure, as well as the elements which are common with those of FIG. 2, two marks $M_1$ and $M_2$ are represented, post-etched into the area $Z_1$. Their precise positions in the area $Z_1$ and the spacing which separates them is not critical. It is sufficient that the functions fulfilled by the other etched elements are not disturbed by their presence.

Still according to a preferred variant, it is desirable for one of the marks, $M_2$ for example, to be a maximal-length mark $l_{max}$. For the latter $l_{max}=l_0+N\Delta l$; N being the maximum number of increments of the modulation signal. This arrangement ensures optimal precision, in the general case. The other mark $M_1$ will have a minimal length $l_0$.

The order of occurrence of these two marks is not critical either. Its suffices in general that will have a minimum advance.

The arrow f in FIG. 6 indicates the direction of drive of the track $P_{ix}$.

Referring again to FIG. 3, the parameters $T_0$ and $\Delta T$ can be kept under control with great precision and are preproducible. It suffices to employ clock signals produced by oscillators having great precision and great stability. Such oscillators are well known. The value N is an item of data known in advance.

On the other hand, the etched elements, $d_1$ to $d_3$ in FIG. 6, representing some information, are produced in an area (area $Z_2$) contiguous with the "flag" area (area $Z_1$) and concurrently with the writing of the reference marks, to within the time of movement. It is therefore possible to use these marks $M_1$ and $M_2$ as a length gauge for the contiguous area: area $Z_2$.

To establish the ideas, it is assumed that the mark $M_1$ is the shortest recordable and has a length $l_0=0.8$ µm.

It is also assumed that the maximum number of increments N is equal to 10. In these conditions, the length of the mark $M_2$ is equal to 4.8 µm, if the increments have a length equal to 0.4 µm. However, it should be clearly understood that, with the exception of the value N=10, the other values, that is to say the lengths, fluctuate from one "flag" area to another. They serve as reference only for the associated information area, that is to say the information area which has been recorded at the same time as the marks and in the same conditions as the latter.

On reading, the lengths associated with the marks $M_1$ and $M_2$, respectively $l_0$ and $(l_0+N\Delta l)$, will be converted into duration information. A time interval $T'_N=T'_0+N\Delta T'$ will correspond to $(l_0+N\Delta l)$. Knowing N, it is possible to deduce $\Delta T'$ therefrom by a simple calculation eliminating $T'_0$. In fact, $$(T'_N - T'_0) = N\Delta T' \text{ and } \Delta T' = \frac{(T'_N - T'_0)}{N}.$$

The process for determination of $\Delta T'$ is thus simple. It suffices to detect the transitions of the signal I, at the instants $t'_1$ and $t'_2$ in FIG. 5, during the reading of the marks $M_1$ and $M_2$. With the aid of a reference clock signal, for example, the durations $T'_0$ and $T'_N$ are deduced therefrom. N being known, any appropriate calculating means makes it possible to calculate $\Delta T'$.

Knowing $\Delta T'$ and $T'_0$ will make it possible to reproduce the recorded information precisely, by comparison with these values or with derived values. An example of embodiment of a device for implementing the method of the invention will be described later.

Although the position of the reference marks $M_1$ and $M_2$ is not critical, it is naturally necessary that it be fixed in advance so that they can be recognized unambiguously upon reading.

Instead of being recorded in the "flag" area (area 1), the marks $M_1$ and $M_2$ may also be recorded in the area $Z_2$ or data area. It is then necessary to implement a method of some sort making it possible to identify them among the other etched elements. It is possible, by way of example, to post-etch information elements used for this purpose or to reserve a fixed position in the information area.

Up until now, only the so-called sampling format has been considered. For the so-called continuous-composite format, it is a solution of the abovementioned type which prevails since the "flags" areas are absent.

Although offering greater precision, a priori, it is not necessary for the marks $M_1$ and $M_2$ to represent respectively the shortest mark and the longest mark repectively.

It is sufficient to record two marks $M_1$ and $M_2$ differing by at least one length increment $\Delta l$. This increment, it should be recalled, corresponds to the time increment $\Delta t$.

If two modulation signals of duration $T_1$ and $T_2$ are considered, there are the following relationships:

$$T_1 = T_0 + N_1 \Delta T$$

$$T_2 = T_0 + N_2 \Delta T$$

in which $N_1$ and $N_2$ are known constants, equal to the respective numbers of increments, and $\Delta T$ the time increment.

It is assumed that $N_2 > N_1$.

It is deduced that $\Delta T$ is given by the formula:

$$\Delta T = \frac{(T_2 - T_1)}{(N_2 - N_1)}$$

In reading, after conversion, a similar formulation is again found:

$$\Delta T' = \frac{(T'_2 - T'_1)}{(N_2 - N_1)}$$

The value of $T'_0$ can be deduced therefrom by calculation:

$$T'_0 = \frac{(T'_1 + T'_0) - (N_1 + N_2)\Delta T'}{2}$$

Finally, in order to refine the process, it is possible to use more than two reference marks.

My way of non-limiting example, it would be possible, in addition to the marks $M_1$ and $M_2$ of length $l_0$ and $(l_0 + N\Delta l)$ to record a third mark $M_3$, representing a mean length. Assuming N to be even, the length of this mark would be $(l_0 + N/2\ \Delta l)$.

It has been assumed up to now that the fluctuations in the length of the reference marks faithfully reflect the local variations in the etching conditions, among other things the local variations in the characteristics of the sensitive material.

Normally, from one site to another, the reference recording conditions undergo only limited changes. It may be that limited changes. It may be, because of transient parasitic phenomena, that the fluctuations in lengths of the marks become suddenly "anomalous" or may be considered as such. This would be the case, for example, if, for the same modulation signal of duration $T_0$, the mark $M_1$ varied in length from single to double.

The position of the marks may also fluctuate abnormally. Due to their natures, the fluctuations of this type should not be taken into account since they do not correspond to fluctuations in the local parameters but to external parasitic phenomena.

In a preferred variant of the method according to the invention, the variations in the parameters related to the reference marks $M_1$ and $M_2$, and, in the first place, the length fluctuations, are stored in memory. It is possible, in order to do this, to use a memory-storage method of the FIFO or "First In First Out" type according to the terminology. At each instant, a certain number of values among the most recent ones are available. It is therefore possible to produce a mean and reject an value greater than or less than a defined percentage of this mean value.

In this latter case, the last valid value adopted for $M_1$ and/or $M_2$ will be taken, for example. It is this value (or these values) which will serve as a length gauge for the contiguous data area (Area $Z_2$) and not the current value or values.

Other methods can also be used. Without producing a mean, it is possible to reject the values which are greater or less than two predetermined limits.

It is also possible to proceed by interpolation between the values (n−1) and (n+1), n being an arbitrary number relating to one of the pairs ($M_1$–$M_2$). (n−1) and (n+1) relate, respectively, to the pairs of marks ($M_1$–$M_2$) which precede and which follow the pair of marks ($M_1$–$M_2$) of rank n. This assumes, however, that the data area $Z_2$ read after the passage of ($M_1$–$M_2$) of rank n is placed in memory.

Finally, it is possible to decide that, if the parasitic phenomenon persists or is reproduced with an abnormal frequency fixed in advance, an alarm signal should be generated.

In every case, it is necessary for the frequency of occurrence of these reference marks to be sufficiently high so that the time interval separating the reading of two series of consecutive marks is, for its part, sufficiently small to make the drifts in the recording and/or reading parameters acceptable.

A priori, in a sampled-type format, such as has just been described, the frequency of appearance of the "flags" is sufficient for this condition to be fulfilled. If that were not the case, for example for a particular material forming the thermosensitive layer, it might be necessary to post-etch the reference marks in the "flags" areas and/or the data areas, in a greater number than the "flags".

The method according to the invention requires only a small amount of additional information which is not directly usable. In the preferred variant of the method, this additional information, that is the say the reference marks, may moreover be recorded in areas (area $Z_1$) which are not usable for recording so-called useful information (area $Z_2$).

The method thus makes it possible to overcome, to a large extent, the parasitic phenomena which have recalled and thus to obtain better reproducibility.

In the final analysis it makes it possible to reduce the length increment and, by this means, to increase the recording density. In fact, with an etching element being read by comparison with a valid reference for a low-amplitude region, the length of the increments is obtained with greater precision.

It remains the case, however, that, even over a short distance, the so-called thermal effect may give rise to fluctuations in the length of the etched elements. These fluctuations could partly destroy the advantages afforded by the invention.

This parasitic effect can be alleviated by applying the teaching of the abovementioned French patent application No. 90 08542.

This parasitic effect and measures allowing it to be alleviated will now be recalled briefly with reference to FIGS. 7 and 8.

In FIG. 7 an information medium 10 is represented in vertical section, moving in the direction of the arrow f. In the case of a disk turning about a vertical axis, the movement is in concentric circles.

In order to write information elements on the tracks of the medium 10, a laser beam 11 is provided, concentrated onto the surface 12 of this disk. As has been seen, the effect of the laser beam is locally to heat the medium 10 so as to give rise, in the heated area, to a physical modification which will then be optically readable, in general with the same laser beam, but of lower power.

The surface of the medium 10 includes, in the example, a thin layer over which the heat brings about an alteration consisting, for example, of an ablation.

The laser beam 11 is of circular cross-section. With respect to the direction f of movement of the medium 10 it exhibits a front extremity 13 and a rear extremity 14.

In the example of FIG. 7, the laser beam is applied to the medium 10 between the points A and B. More precisely, at the start of the writing sequence, the front edge 13 of the beam 11 is at the point A and, at the end of the writing sequence, the rear edge 14 of the beam 11 is at the point B.

It is noted that the etched element 15 written onto the medium 10 exhibits a front edge 16 which does not coincide with the point A, and a rear edge 17 which, likewise, does not coincide with the point B. The main offset d is between the points A and 16. In what follows, reference will be made, above all, to this offset.

These offsets mean, on the one hand, that the etched element 15 does not exactly have the desired position and, on the other hand, that the length of this information element 15 is different from the desired length.

The corresponding time offset $\Delta\tau$ may be expressed by the following formula:

$$\Delta\tau = \tau_0 + \Delta\tau_1$$

in this formula $\tau_0$ is a constant-value term for the same recording medium and the same type of recorder and $\Delta\tau_1$ is a term whose value depends on previously-recorded patterns. More precisely, $\tau_0$ is the value of the offset when an isolated element is written, without an element preceding it. In these conditions, it is shown that $\Delta\tau_1$ has a negative value.

The characteristic parameters of the recorder which play a part in defining $\tau_0$ are, especially, the dimensions of the write spot, its power, and the speed of movement of the information medium with respect to the writing beam.

The spatial offset d is due to the fact that a delay exists between the start of the application of the beam 11 to the medium 10 and the moment when the temperature of the site illuminated by the medium reaches the value which is sufficient for writing information.

In FIG. 8, at the lower part, is represented the etched element 20 which has just been written, in solid lines, and, in broken lines, an etched element 21 which is to written. The upper part shows the temperature $t_e$ of the substrate along the track on which the marks are being made. The temperature $t_{e0}$ is the temperature of the medium 10 in its entirety in the absence of heating, that is to say the ambient temperature.

The curve 22 of FIG. 8 shows that, immediately after the formation of the etched element 20, the temperature of the medium 10 at the site of this etching element is still substantially higher than the ambient temperature and that the temperature at the adjacent site 21 is also higher than the ambient temperature $t_{e0}$ although lower than the temperature at the site of the etched element 20.

From these considerations it results that the delay $\Delta\tau$ is smaller when an etched element has just been written at a preceding site than in the case in which the medium 10 is at the ambient temperature $t_{e0}$. It is the (negative) term $\Delta\tau$ which expresses this dependence of $\Delta\tau$ with respect to the previously written elements. This term $\Delta\tau_1$ depends on the length l of the etched element 20 and on the distance $l_1$ separating the etched elements 20 and 21. The writing of the etched elements written before the etched element 20 thus makes a contribution to the term $\Delta\tau_1$. However, it has been noted that, from the fourth preceding etched element, the contribution becomes negligible for the modulation formats and codes widely used at the present time.

The abovementioned French patent application proposes several embodiment variants suitable for correcting $\Delta\tau_1$ and/or $\tau_0$.

In the context of the invention, it is the first time offset, $\Delta\tau_1$, which is the most troublesome since $\tau_0$ is substantially constant for one medium and one recorder/reader appliance.

It will thus be same for the reference marks $M_1$ and $M_2$ (FIG. 6) and for the other etched elements whatever the zone in question.

Only the principal arrangements making it possible to correct the $\Delta\tau_1$ term will therefore be recalled, which arrangements are the subject of one of the embodiment variants described in the abovementioned application.

According to this embodiment variant, during the recording phase, the two terms $\tau_0$ and $\Delta\tau_1$ or the single term $\Delta\tau_1$ are corrected. In order to correct this $\Delta\tau_1$ term, there is provision for recording, in a memory, which may be one of the areas of the information medium, the variation law of the offset $\Delta\tau_1$, or of the offset $\tau_0 + \Delta\tau_1$ as a function of the previously written information elements and of the time separating the writing in progress from the previous writing.

The temperature at a site on the medium also depends on the length of the previously written elements and on their spacing from the place in question.

Hence, a memory is provided with values of $\Delta\tau_1$ as a function of the length of the previously written elements and of their separation from the element to be written. It is possible to take account only of a single preceding element. For better precision in the calculation, several elements which precede will brought into play; in any event, it will not, in general, be necessary to take account of more than four preceding elements, as has been indicated.

These value tables are determined in advance in the factory by the medium and/or recorder/reader manufacturer.

For preference, the table is inserted into memory of the information medium in prerecorded data areas, when a so-called sampled format is involved. This table will thus be specific to the medium in question. However the values of $\Delta\tau_1$ will possibly vary from one type of recorder to another.

When dealing with a disk turning at constant speed, the dimensions of the information elements vary as a function of the radius of the track on which the element is found. In this case, the law (or table) for determining the values of $\Delta\tau_1$ will take account of the radius. In general the $\Delta\tau_1$ values vary linearly with the radius.

For further details as to the device allowing the method which has just been recalled to be implemented, reference will usefully be made to the abovementioned patent application.

A device allowing the method according to the invention to be implemented will now be described.

In order to establish the ideas, without that being a limitation on the scope of the invention, the operation of an optical disk recorder-reader appliance will now be recalled briefly, with reference to FIG. 9.

FIG. 9 diagrammatically illustrates an example of an appliance for recording/reading on a medium by an optical route. A disk 90 turning in a plane around an axis parallel to the third axis of the three-axis reference system XYZ includes, on its upper face, a layer of thermosensitive material in which information has been recorded along tracks 91. These tracks also include flags $Z_1$ associated with a specific code in accordance with what has been described and areas $Z_2$ intended for the recording of information. The disk, with a diameter of about 30 cm, is given a rotational movement, imparted by a drive motor integral with the chassis of the optical recording-reading system. Typically, the tracks, for example 40,000 in number, are written within a crown centred on the axis of rotation and of width equal to about 8 cm. The number of flags written, per concentric circular track, must be sufficient to overcome parasitic phenomena related to the nature of the medium or to the fluctuation in the rotational speed. Typically, between 1300 and 3500 flags are written per tracks, having regard to the preceding data.

In the embodiment example illustrated by FIG. 9, the device for access to a predetermined track of the disk comprises a fixed part including an energy source (not represented) generating a beam of parallel rays $F_0$ and a movable part consisting of the recording/read head proper. As is known, the latter comprises an objective lens of the microscope type $O_b$, integral with an electromagnetic coil B moving in the magnetic field of a permanent magnet (not represented) providing vertical slaving or focussing and a galvanometric mirror $Mi_1$ providing the radial slaving. The galvanometric mirror $Mi_1$ is movable about an axis $\Delta_y$ parallel to the axis OY of the three-axis reference system so as to provide the said radial slaving. The beam $F_0$ is focussed into a spot $_{ta}$ at a predetermined place on the disk onto one of the abovementioned tracks 91. It is assumed here that the system is of the single beam/single track type, that is to say a system in which the single beam $F_0$ serves alternately for writing and reading as well as for providing the functions of radial track following and of focussing. This aspect is outside the scope of the invention.

In order to detect the read beam reflected by the disk, a semi-transparent plate $Mi_2$, for example, is interposed on the path of the single beam $F_0$. The beam reflected by the disk is then detected by photodetector means D which generate the signal $V_1$. The latter is transmitted to signal processing logic circuits LO.

These latter circuits, in addition to the circuits which are common to the prior art, incorporate circuits which are specific to the invention and which will now be described.

The reading of an information element, such as $d_1$, $d_2$ or $d_3$ in FIG. 6, gives as information, after conversion, after conversion, one of the pulses of durations which will be called $T'_x$. It is necessary to relate these durations read to the initial durations of the signal used for the modulation. In other words, it is necessary to deduce therefrom the number of associated increments. It has been seen, by way of example, that a duration $T'_0$ corresponded to the duration $T_0$, and that $\Delta T'$ corresponded to a time increment $\Delta T$.

According to the invention, comparisons of the direct or indirect values read will be carried out with reference values which are valid for an area $Z_2$ of limited extent. These values are those derived from reading the marks $M_1$ and $M_2$.

In the preferred variant, it is the area $Z_2$ associated with a single "flag" area which contains the marks $M_1$ and $M_2$.

Various methods may be employed to arrive at this result. By way of non-limiting example, a circuit for implementing the method of the invention will be described with reference to FIGS. 10 and 11.

FIG. 10 diagrammatically illustrates the circuit used. Use is made of a clock signal which is of high frequency compared with the frequency of occurrence of the pulsed signals representing the information, as well as the duration reference signals derived from the marks $M_1$ and $M_2$.

It is, naturally, necessary for the frequency of the signal $H_R$ to be very stable. Moreover, the higher the frequency, the greater the precision obtained in the process of reproducing the information signals. Typically, a ratio higher than 10 between the frequency of occurrence and the frequency of the clock signals will be used.

The timing diagram of FIG. 11 illustrates these various signals. The clock signal is denoted $H_R$ in the figure and the duration reference signals $T'_0$ and $T'_N$.

An information signal, denoted $T'_x$ has also been represented.

Referring again to FIG. 10, the main element of the circuit for implementing the method of the invention, in this embodiment variant, is a counter C.

It receives the clock signal $H_R$ on one input $e_c$ via a logic circuit $LO_1$. The latter performs the logic "AND" function, by combining the read signal I and the clock signal $H_R$. The signal I is obtained from the signal $V_1$ (FIG. 9) in the way which was explained with reference to FIG. 5. The counter can therefore count the clock pulses $H_R$, as illustrated in FIG. 12, only in the presence of the pulsed signals read: periods $T'_O$, $T'_N$ and more generally $T'_x$.

This counter C successively delivers, onto a bus $S_C$ connected to a parallel output, an image binary word the counting states: $C_{n1}$, $C_{n2}$ and $C_{nx}$ (FIG. 12). These states are expressed by binary words $n_1$, $n_2$ and $n_x$.

In other words, the counter C converts the durations $T'_0$, $T'_n$ and $T'_x$ into a series of numbers $n_1$, $n_2$ and $n_x$ proportional to these durations.

It is assumed that the logic circuit LO of FIG. 9 generate a signal W during a time window encompassing the pulses $T'_0$ and $T'_N$. Taking the context of a recording format of so-called sampled type, it suffices to detect the position of the flags in order to generate such a signal. In the general case, the position of the marks $M_1$ and $M_2$ being known, the generation of such a signal W presents no difficulty.

The signal $S_{MON}$ is also needed, generated upon detection of falling edges of the signals $T'_0$, $T'_N$ and $T'_x$. In order to do this, a monostable MON may be used, triggered on the falling edges of the signals $T'_0$ to $T'_x$. The latter delivers the pulsed signal $S_{MON}$ as output.

This signal is used first of all to reset the zero-counter to the initial state. Preferably, it will be reset to the zero state. The signal is transmitted to a zero-reset input provided for this purpose.

In order to be usable later, the binary words $n_1$, $n_2$ and $n_x$ must be stored in memory. To this end, a memory MEM is used. For ease of explanation, it is assumed that this memory includes two separate areas. A first area is intended for storing permanent values, such as the maximum number of increments N, or semi-permanent values, the numbers $n_1$ and $n_2$ which vary only when a new area $Z_1$ is read, that is to say new reference marks $M_1$ and $M_2$.

A second area is used for recording the successive values $n_x$ corresponding to the information elements $d_1$, $d_2$ or $d_3$. A logic routing circuit SW receives the parallel output from the counter $S_C$. The routing between one and the other of the two memory areas is conditioned by the state of the time window signal W. Moreover, the actual memory storage takes place on detection of falling edges of signals $T'_0$ to $T'_x$. In order to do this, it is conditioned by the appearance of the signal $S_{MON}$.

Resetting the counter to zero must take place after the said memory storage. It is therefore necessary to provide a delay before actual zero-reset. Such arrangements are known.

In summary, there are thus two main phases: a phase of placing reference values $n_1$ and $n_2$ in memory, and a phase of successively placing the various values $n_x$ in memory.

These values will allow determination of the numbers of increments attached to each information elements, and thus their reproduction upon reading.

In fact, if the interval of time separating two consecutive clock pulses $H_R$ is called dt, the following equations describe the implementation method for the reproduction of the information:

for $T'_O$, $T'_O = n_1 dt$ for $T'_N$, $T'_N = n_2 dt = T'_O + N\Delta T'$ for $T'_x$, $T'_x = n_x dt = T'_O + N_x \Delta T'$ in which equations N is the maximum number of increments and $N_x$ the number of increments of any information element $d_x$.

Simplifying, the value of $N_x$ is deduced therefrom:

$$N_x = N \left( \frac{n_x - n_1}{n_2 - n_1} \right)$$

Following inaccuracies in the counting, for example inaccuracies due to the relative instants of occurrence of the falling edges and of the clock pulses, the number $N_x$ thus calculated may not be an integer number. In this case, the integer value of the number $N_x$ will be taken.

In order to carry out the previously described calculation, any appropriate digital calculating means is used, which means will be called computer CAL in FIG. 10, and which receives the values N, $n_1$, $n_2$ and $n_x$ from the memory MEM.

It should, however, be noted that the successive calculations of the numbers $N_x$ must take place outside the period of acquisition of the values $n_1$ and $n_2$, and between the acquisitions of two successive $n_x$ numbers. In order to do this, an enabling circuit VAL has been represented in FIG. 10.

To this end, it receives the time window signal W and the falling-edge detection signal $S_{MON}$.

In reality, the memory MEM may consist simply of a series of registers.

In another variant, not illustrated, the memory and the computer can be combined into a single memory-based stage of the programmable read-only type, or PROM, according to the terminology, in which the laws making the calculations possible are recorded.

It may also be noted that it is not strictly necessary to record the different values of $n_x$. In one variant, not illustrated, it is possible to transmit this value directly to the computer via the router $S_C$. It is the same for N, which could be a hard-wired value permanently transmitted to the computer.

The routing circuit SW may be produced with the aid of combinational logic gates. An embodiment example is illustrated by FIG. 12.

The circuit SW includes two series of gates, denoted $LO_2$ and $LO_3$ of three-input logic "AND" type. The second gate, $LO_3$, includes an inverting input $e_3$ along its three inputs.

The two gates $LO_2$ and $LO_3$ receive on their inputs, $e_{21}$ and $e_{31}$ respectively, the time window signal W and, on their inputs $e_{22}$ and $e_{32}$, the signal $S_{MON}$.

It has been seen that the signal transported by the bus $S_C$ of FIG. 10 is multi-bit binary word representing the state of the counter C. Each bit $b_y$ of this binary word is sent to one of the inputs $e_{23}$ and $e_{33}$ of the logic "AND" circuits $LO_2$ and $LO_3$.

By this means, the bits of the word $n_1$ and $n_2$, representative of the respective durations $T'_O$ and $T'_N$, are transmitted on the outputs $S_1$ of the logic circuits of the series $LO_2$ during the time interval W (FIG. 11) of the time window W, and the bits of the words $n_x$, representative of the successive durations $T'_x$ on the outputs $S_2$ of the logic circuits of the series $LO_3$, outside this time interval $T_W$.

The enabling circuit VAL, as represented in FIG. 13, may be produced simply by an "AND" logic gate, $LO_4$ with two inputs, one of which is inverting. The direct input receives the $S_{MON}$ signal, and the inverting input the time window signal W. The calculation of the values $N_x$ is thus initialized upon the detection of the falling edges and only outside the interval $T_W$. The subsequent use of $N_x$ is outside the scope of the invention. The processing of this value is carried out according to the known art.

The invention is not limited only to the embodiment variants of the methods and devices described in detail.

Although more particularly beneficial in the context of a so-called sampling recording format, it applies equally well to the so-called continuous-composite format.

Neither is it limited solely to the pulse-width modulation code of the type described, but applies to all codes in which the position of the transitions represents information and thus must be determined precisely.

It applies more generally to every case for which recording relies on a method which does not allow control of the form factor to be exercised with sufficient precision. This is the case especially when use is made for the recording of a thermal effect, an effect which is non-linear originating largely from phenomena which it is desired to overcome. In order to surmount this problem, the invention provides for the formation of reference marks with lengths associated with a nearby area for recording information elements, formation carried out in the same conditions as for the information elements.

I claim:

1. A method for recording and reading information on a movable media having a sensitive layer and being driven at a uniform speed, said method comprising the steps of:

recording said information during a writing phase including a first step of forming first variable-length alterations in said sensitive layer separated from one another by unaltered regions, by converting variable duration pulsed information signals wherein transitions between said alterations and said unaltered regions represent said information and wherein said writing phase further includes a second step of forming a series of sequences of length-reference second alterations in said sensitive layer, each of said second alterations being of different length and each sequence of said series of sequences including at least two alterations and wherein each sequence of said series of second alteration is associated with a predetermined area in which said first variable-length alterations are formed and wherein each of said sequences of alterations of said series forms a length reference for said predetermined area;

reading said information in a read phase including a first step of reading said length-reference second alterations and converting said length-reference second alterations into duration-reference pulsed signals, for a respective associated with predetermined area and said read phase further includes a second step of reading said first variable-length alterations representing information formed in said associated predetermined area and converting said first variable-length alterations into pulsed signals and a third step of reproducing said recorded information by comparison with said duration-reference pulsed signals.

2. Method according to claim 1 wherein the pulsed information signals are modulation signals digitally coded in duration, by jumps of time increments, the said first variable length-reference alternations are distributed over the medium in pairs and formed by conversion of pulsed signals of a first duration and of a second duration, these durations differing by at least one time increment.

3. Method according to claim 2 wherein said first duration is chosen such that the length-reference alteration obtained with the aid of the signal of this duration has a minimal length, this length being in a one-to-one relation with a minimal duration of the modulation signals, and the said second duration is chosen such that the alteration obtained with the aid of the signal of this duration has the said minimal length, to which is added a defined number of increments N of length, N being equal to the maximum number of time increments of the modulation signals; and in that the step of reproducing the recorded information comprises the determining of the durations of the converted signals corresponding to the alterations serving a length reference, and the determination, on the basis of these durations, of parameters in one-to-one relation with the said minimal duration and the time increment.

4. Method according to claim 3 wherein the reproduction step comprises the calculation of the duration of one time increment by subtraction from the duration of the signal resulting from the conversion of the length-reference alteration of maximal length, of the duration of the signal resulting from the conversion of the length-reference alteration, of minimal length, followed by the division by the said number N, this time increment serving as a reference for the said associated predetermined area.

5. Method according to any one of claims 2 to 4 and 1, wherein fluctuations of the parameters associated with the reference marks are stored in memory and in that comparisons are made with reference values in order to ignore the marks of which the said associated parameters are outside a predetermined range.

6. Method according to any one of claims 2 to 4 and 1, wherein, the said medium being equipped with a superficial thermosensitive layer, the alterations consist of a localized ablation of the said layer by irradiation of the latter with the aid of a laser beam.

7. Method according to any one of claims 2 to 4 and 1, wherein said medium including, alternately, distributed along tracks, areas of a predetermined first type in which said first alterations are formed during a preliminary, prerecording phase, and areas of a second type intended for recording the said information, the sequences of length-reference alterations are formed in a defined region of the areas of the first type and are associated with a contiguous area of the second type.

8. Method according to claim 7 wherein said method comprises, in a preliminary phase, a step of prerecording information used to compensate, upon recording or upon reading information, for the offset between the actual site of each said first alteration of the said layer on the medium and a desired site.

9. Method according to claim 8, wherein said prerecorded information comprise data making it possible to calculate said offset as a function of parameters related to at least one alteration previously formed on the medium.

10. Method according to claim 9, wherein the parameters relating to the previously formed said at lease one alteration are its length and the distance separating said at least one alteration from a subsequent alteration to be formed.

11. Method according to any one of claims 2 to 4 and 1, wherein said medium consists of a disk.

12. Device according to claim 1, wherein further comprises a logic circuit enabling determination of the number of increments only during the periods separating two detections of said information alterations representing information.

13. Device according to claim 1, wherein said means for converting the lengths of the first variable-length alternations into numbers comprises a digital counter receiving and counting clock signals of much higher frequency than the frequency of occurrence of alteration detection, a logic circuit allowing counting only during the periods of detection of the said alterations and means for resetting the counter to an initial state after the end of the detection of the said alterations.

14. A device for recording/reading information along tracks of a moveable medium being driven at a uniform speed, said device comprising:

means for detecting length-reference alterations in a sensitive layer of said movable medium and information representing alterations in said layer representing recorded information, and for converting said length-reference alterations and said information alterations into electrical signals;

means for converting the length of said detected length-reference alterations and said information alterations into numbers proportional to said length;

means for storing in memory at least said numbers corresponding to the detection of said length-reference alterations; and calculating means for determining a number of increments associated with each said information alteration detected and converted into one of said electrical signals, on the basis of said numbers and of a maximum number of increments (N).

15. A method for recording and reading information on a movable media having a reference surface and being driven at a uniform speed, said method comprising the steps of:

recording said information during a writing phase including a first step of forming first variable-length deviations from said reference surface by converting variable duration pulsed information signals wherein transitions from said deviations to flat surface areas between said deviations represent said information and wherein said writing phase further includes a second step of forming a series of sequences of length-reference second deviations from said reference surface, each of said second deviations being of different length and each sequence of said series of sequences including at least two deviations and wherein each sequence of said series of second deviations is associated with predetermined area in which said first variable-length deviations are formed and wherein each of said sequences of deviations are formed and wherein each of said sequences of deviations of said series forms a length reference for said predetermined area;

reading said information in a read phase including a first step of reading said length-reference second deviations and converting said length-reference second deviations into duration-reference pulsed signals, for a respective associated said predetermined area and said read phase further includes a second step of reading said first variable-length deviations representing information formed in said associated predetermined area and converting said first variable-length deviations into pulsed signals and a third step of reproducing said recording information by comparison with said duration-reference pulsed signals.

* * * * *